US008379866B2

(12) United States Patent
Yang et al.

(10) Patent No.: US 8,379,866 B2
(45) Date of Patent: Feb. 19, 2013

(54) METHOD OF DISTRIBUTING ENCODING/DECODING PROGRAM AND SYMMETRIC KEY IN SECURITY DOMAIN ENVIRONMENT AND DATA DIVIDER AND DATA INJECTOR THEREFOR

(75) Inventors: Jin Seok Yang, Daejeon (KR); Young Seok Chung, Daejeon (KR); Chang Su Hong, Gyeonggi-do (KR); Jung Woo An, Seoul (KR); Jong Jin Won, Daejeon (KR); Jong Cheol Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 782 days.

(21) Appl. No.: 12/555,279

(22) Filed: Sep. 8, 2009

(65) Prior Publication Data

US 2010/0128876 A1 May 27, 2010

(30) Foreign Application Priority Data

Nov. 21, 2008 (KR) .................. 10-2008-0116301

(51) Int. Cl.
*H04L 9/08* (2006.01)
*H04K 1/00* (2006.01)
(52) U.S. Cl. .................. 380/279; 380/283
(58) Field of Classification Search .............. None
See application file for complete search history.

(56) References Cited

U.S. PATENT DOCUMENTS

| | | | | |
|---|---|---|---|---|
| 5,129,074 A * | 7/1992 | Kikuchi et al. | ............... | 711/173 |
| 6,363,154 B1 * | 3/2002 | Peyravian et al. | ........... | 380/283 |
| 6,956,951 B2 * | 10/2005 | Shimoyama et al. | ......... | 380/277 |
| 7,088,822 B2 * | 8/2006 | Asano | .............. | 380/45 |
| 7,095,851 B1 * | 8/2006 | Scheidt | ................ | 380/44 |
| 7,224,804 B2 * | 5/2007 | Ishiguro et al. | ............... | 380/279 |
| 7,225,339 B2 * | 5/2007 | Asano et al. | ................. | 713/193 |
| 7,269,257 B2 * | 9/2007 | Kitaya et al. | .................. | 380/45 |
| 7,505,599 B2 * | 3/2009 | Ishiguro et al. | ............... | 380/278 |
| 7,707,410 B2 * | 4/2010 | Ishiguro et al. | ............... | 713/163 |
| 7,787,627 B2 * | 8/2010 | Sood et al. | .................... | 380/277 |
| 2005/0105737 A1 * | 5/2005 | Asano | ........................ | 380/277 |
| 2007/0263875 A1 * | 11/2007 | Kitaya et al. | .................. | 380/279 |
| 2008/0031461 A1 | 2/2008 | Shear et al. | | |
| 2008/0082818 A1 | 4/2008 | Kim et al. | | |
| 2011/0182427 A1 * | 7/2011 | Long et al. | .................... | 380/255 |

FOREIGN PATENT DOCUMENTS

| | | |
|---|---|---|
| EP | 1 845 652 A1 | 10/2007 |
| KR | 1020060051957 A | 5/2006 |
| KR | 1020080029685 A | 4/2008 |

OTHER PUBLICATIONS

Ahmet M. Eskicioglu, et al; "A Key Transport Protocol Based on Secret Sharing Applications to Information Security", IEEE Transactions on Consumer Electronics, vol. 48, No. 4, Nov. 2002, pp. 816-824.

* cited by examiner

*Primary Examiner* — Christopher Revak
(74) *Attorney, Agent, or Firm* — Ladas & Parry LLP

(57) ABSTRACT

A method of distributing an encoding/decoding program and a symmetric key in a security domain environment, and a device divider and data injector therefor are provided. The method includes selecting, at a highest-level security domain, an encoding/decoding program and a symmetric key to be distributed to a plurality of lower-level security domains; dividing the selected encoding/decoding program and the symmetric key into pieces as many as the number of lower-level security domains; and distributing the divided encoding/decoding program pieces and the symmetric key pieces to devices belonging to the lower-level security domains.

10 Claims, 4 Drawing Sheets

METHOD OF DISTRIBUTING ENCODING/DECODING PROGRAM AND SYMMETRIC KEY IN SECURITY DOMAIN ENVIRONMENT AND DATA DIVIDER AND DATA INJECTOR THEREFOR

CROSS-REFERENCE TO RELATED APPLICATION

This application claims priority to and the benefit of Korean Patent Application No. 10-2008-0116301, filed Nov. 21, 2008, the disclosure of which is incorporated herein by reference in its entirety.

BACKGROUND

1. Field of the Invention

The present invention relates to a method of distributing an encoding/decoding program and a key in a security domain environment and a data divider and a data injector therefor. More particularly, the present invention relates to a method of safely distributing an encoding/decoding program and a symmetric key from a highest-level security domain to lower-level domains by dividing them using a data divider in the highest-level security domain and injecting them to an encoding/decoding device using a data injector.

2. Discussion of Related Art

In order to protect an encoding/decoding program and a key, generally, a public key is used, or a key capable of authenticating the other party's device is stored in an encoder/decoder, and a key is induced after the authentication.

The public key may be appropriately used when a plurality of keys are used. However, an encoding/decoding algorithm is asymmetrical, and requires a tremendous amount of mathematical calculations, and thus the public key may be inappropriate for real-time data processing and within a narrow-bandwidth network environment.

In the meantime, in order to store an authentication key in the encoder/decoder, the authentication key should be shared between an encoding party and a decoding party in advance. When a device of the encoding party is captured, the authentication key may be exposed due to de-capping, and may be vulnerable to a fake attack caused by a man-in-the-middle-attack.

Furthermore, within the security domain environment in which security is very highly demanded, there are at least two domains divided by security levels depending on a degree of secret, and devices included in different security domains manage confidential information according to defined regulations on actions.

Therefore, a method of safely distributing an encoding/decoding program and a related symmetric key from a device belonging to a highest-level security domain to a device belonging to a lower-level security domain is needed.

SUMMARY OF THE INVENTION

The present invention is directed to a method and device for safely providing an encoding/decoding program and a key to an encoder/decoder, in which a device belonging to a highest-level security domain divides the encoding/decoding program and the key and distributes the divided pieces of the encoding/decoding program and the key to devices belonging to lower-level security domains. The encoding/decoding program and key can be used only when all of the divided pieces are injected into the encoder/decoder and be finally combined with each other.

One aspect of the present invention provides a method of distributing an encoding/decoding program and a symmetric key including: selecting, at a highest-level security domain, an encoding/decoding program and a symmetric key to be distributed to a plurality of lower-level security domains; dividing the selected encoding/decoding program and the symmetric key as many into pieces as the number of lower-level security domains; and distributing the divided encoding/decoding program pieces and the symmetric key pieces to devices belonging to the lower-level security domains.

The method may further includes injecting the divided encoding/decoding program pieces and the symmetric key pieces received by the devices belonging to the lower-level security domains into an encoder/decoder, wherein the encoder/decoder is executed only when all of the divided encoding/decoding program pieces and the symmetric key pieces are injected into the encoder/decoder.

Another aspect of the present invention provides a data divider including: a database storing at least one encoding/decoding program and at least one symmetric key; a program selection unit providing a user interface such that a user selects one of the at least one encoding/decoding program to be distributed to a plurality of lower-level security domains; a key selection unit providing a user interface such that the user selects one of the at least one symmetric keys to be distributed to the lower-level security domains; a divider dividing the selected encoding/decoding program and the selected symmetric key into pieces as many as the number of the lower-level security domains; and a combination unit combining each piece of the divided encoding/decoding program with each piece of the divided symmetric key to form each combined file.

Still another aspect of the present invention provides a data injector including: a file receiver receiving a file including a piece of an encoding/decoding program and a piece of a symmetric key from a highest-level security domain; a converter converting the file into a format executable by an encoder/decoder; and a communication unit communicating with the encoder/decoder to inject the converted file to the encoder/decoder.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EMBODIMENTS

The present invention will be described more fully hereinafter with reference to the accompanying drawings, in which exemplary embodiments of the invention are shown. This invention may, however, be embodied in different forms and should not be construed as limited to the embodiments set forth herein.

Figure 1:
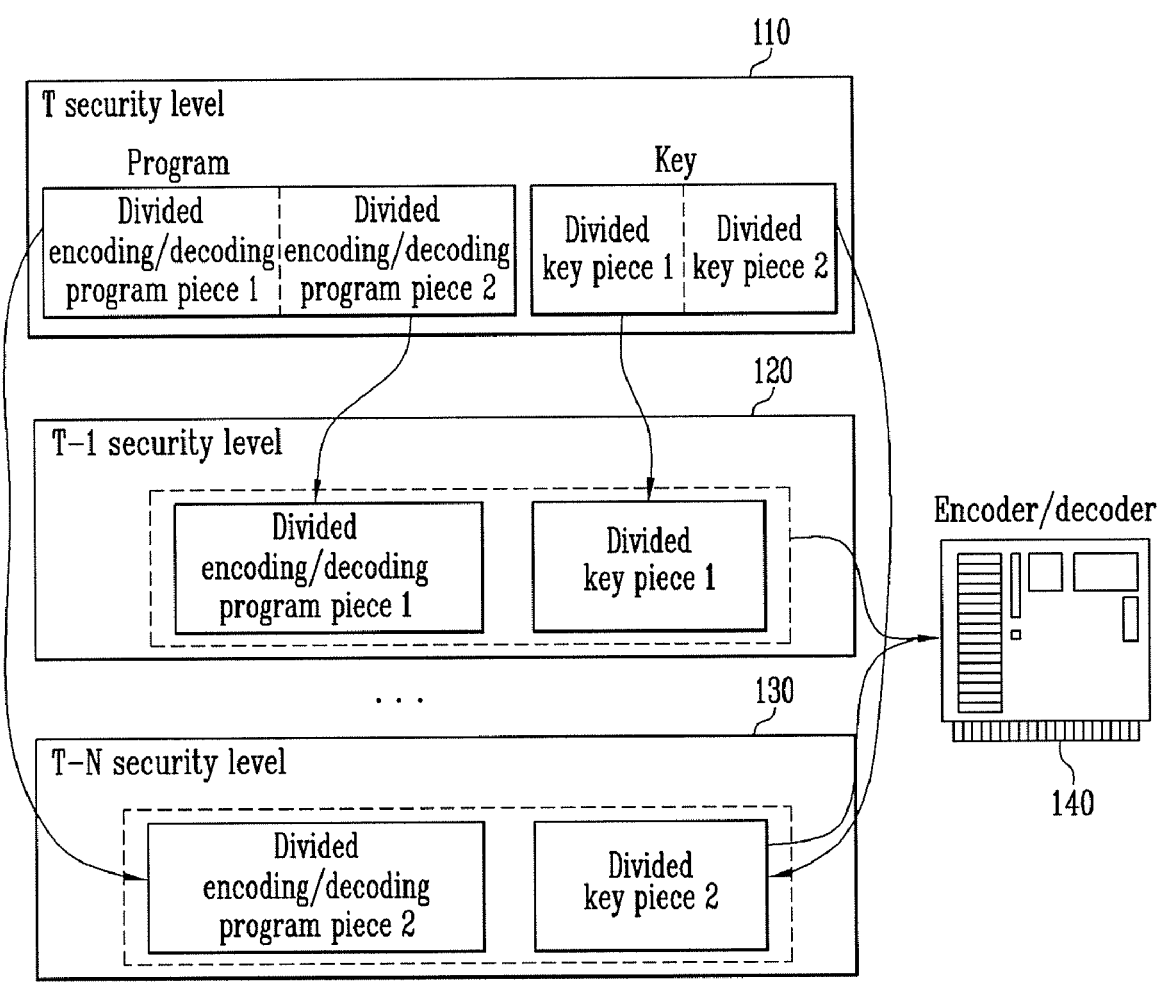
FIG. 1 conceptually illustrates a method of distributing an encoding/decoding program and a symmetric key in a security domain environment according to an exemplary embodiment of the present invention.

FIG. 1 conceptually illustrates a method of distributing an encoding/decoding program and a symmetric key in a security domain environment according to an exemplary embodiment of the present invention. As illustrated, a device belonging to a highest security level T 110, i.e., a unit (or an organization) included in a highest-level security domain divides an encoding/decoding program and a symmetric key that require secrecy as many as the number of lower-level security domains. For example, as illustrated in FIG. 1, when there are two lower-level security domains (T-1 and T-2), the highest-level security domain divides the encoding/decoding program and the symmetric key into two pieces.

In order to divide the symmetric key, a secret sharing or exclusive-OR method may be used.

The divided encoding/decoding program pieces and the divided symmetric key pieces are distributed to devices belonging to T-1 and T-2 security levels 120 and 130, e.g., devices managed by an encoding/decoding hardware manufacturer and related application program developer.

The divided encoding/decoding program pieces and the divided symmetric key pieces are injected into an encoder/decoder 140 by each device belonging to the lower-security level domains and then combined with each other in a complete form, so that the encoder/decoder 140 can be executed.

Figure 2:
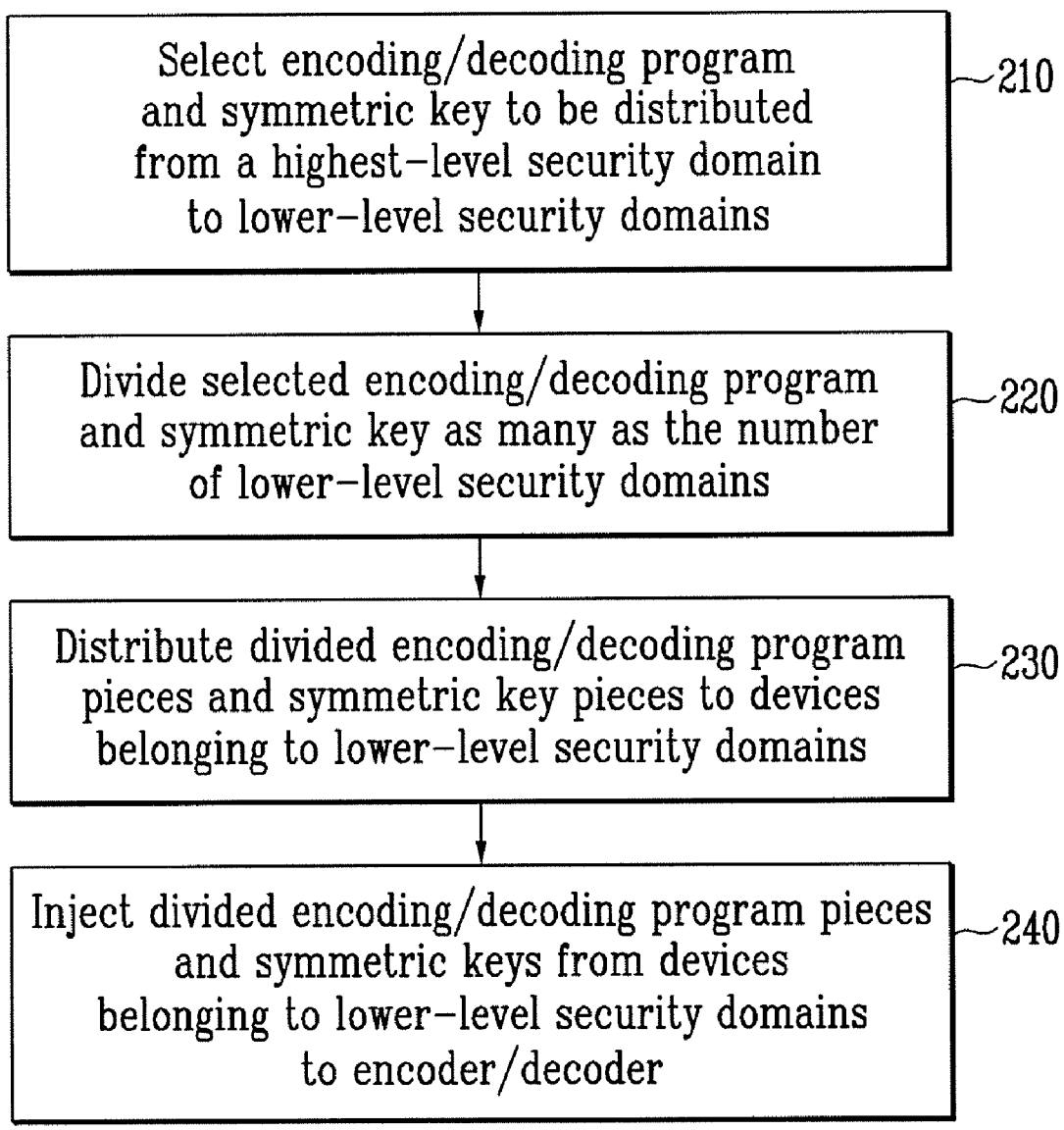
FIG. 2 is a flowchart illustrating a method of distributing an encoding/decoding program and a symmetric key according to an exemplary embodiment of the present invention.

FIG. 2 is a flowchart illustrating a method of distributing an encoding/decoding program and a symmetric key according to an exemplary embodiment of the present invention.

In step 210, a device belonging to a highest-level security domain selects an encoding/decoding program and a symmetric key to be distributed to lower-level security domains.

In step 220, the selected encoding/decoding program and symmetric key are respectively divided into pieces as many as the number N of lower-level security domains. A method of dividing the encoding/decoding program may vary depending on a platform of an encoder/decoder and an implementation method thereof. In an exemplary embodiment, the encoding/decoding program may be divided into at least one executable file and at least one library (e.g., an executable file and a DLL, an executable file and another executable file calling for the executable file). Such a division enables an executable file to be safe even if the executable file is exposed, since it cannot be executed by itself.

In step 230, the divided encoding/decoding program and symmetric key are distributed to devices belonging to the lower-level security domains. In an exemplary embodiment, the divided encoding/decoding program pieces and the divided symmetric key pieces may be distributed through a network connecting a device belonging to the highest-level security domain to devices belonging to the lower-level security domain. In another embodiment, they may be distributed using a portable storage device such as a universal serial bus (USB) memory device in an off-line manner.

In step 240, the devices belonging to the lower-level security domains receive the divided encoding/decoding program pieces and the divided symmetric key pieces and inject them into the encoder/decoder. The encoder/decoder cannot operate until all of the divided encoding/decoding program pieces and the divided symmetric key pieces are completely input into the encoder/decoder by the devices belonging to the lower-level security domains.

Figure 3:
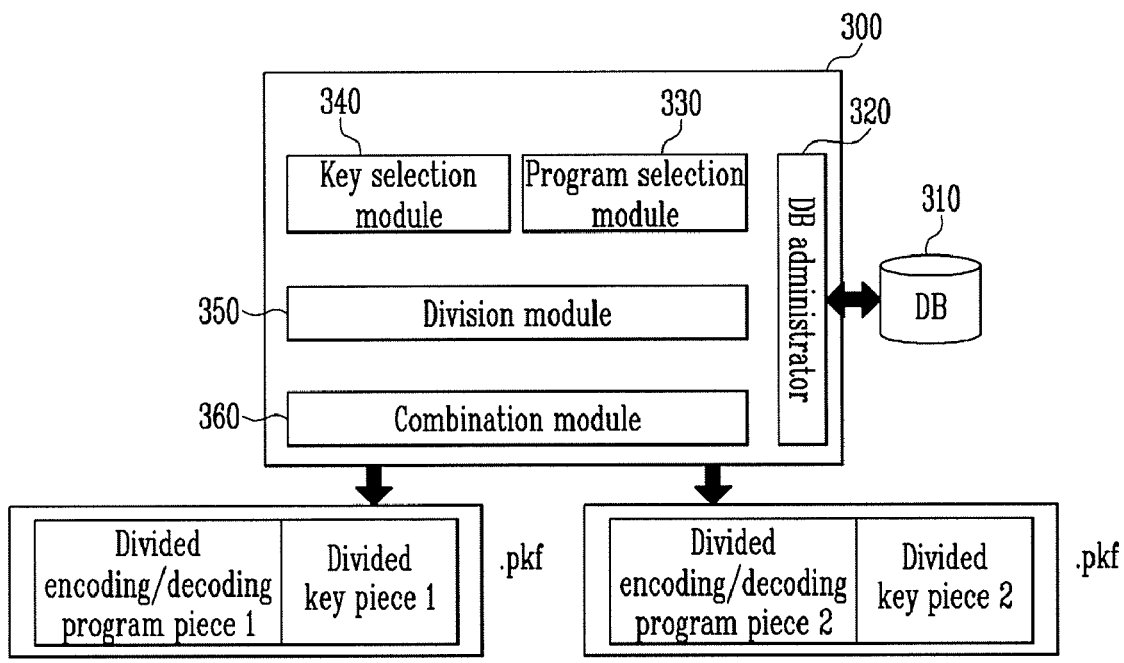
FIG. 3 is a block diagram of a data divider according to an exemplary embodiment of the present invention.

FIG. 3 is a block diagram of a data divider according to an exemplary embodiment of the present invention. As described above, the data divider is used such that a device belonging to a highest-level security domain divides an encoding/decoding program and a symmetric key to be distributed to lower-level security domains as many as the number of the lower-level security domains.

As illustrated, the divider 300 according to the present invention includes a DB 310, a DB administrator 320, a program selection module 330, a key selection module 340, a division module 350 and a combination module 360. The DB 310 stores at least one encoding/decoding program and at least one symmetric key. The DB administrator 320 communicates with the DB 310 to store or access the encoding/decoding programs and symmetric keys in the DB 310. The program selection module 330 provides a user interface such that a user selects one of the encoding/decoding programs stored in the DB 310. The key selection module 340 provides a user interface such that the user selects one of the symmetric keys stored in the DB 310. The division module 350 divides the selected encoding/decoding program and the selected symmetric key into pieces as many as the number of lower-level security domains subject to the distribution. The combination module 360 combines each piece of the divided encoding/decoding program with each piece of the divided symmetric key to generate each combined file. The number of the combined files is the same as that of the lower-level security domains.

In one exemplary embodiment, a combined file has an extension of .pkf, and may be stored in the DB 310 before being distributed to the lower-level security domains.

The combined files are distributed to the lower-level security domains through a network or a portable storage device such as a USB memory device. The lower-level security domains that receive the combined files need a data injector for injecting the received file into an encoder/decoder.

Figure 4:
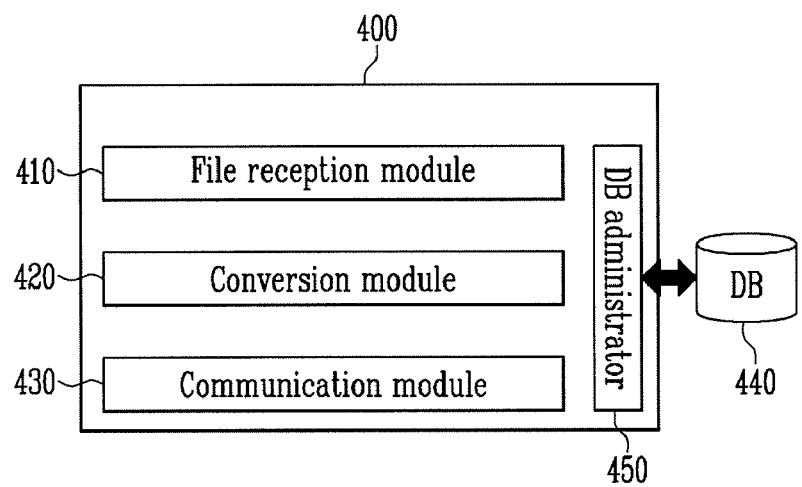
FIG. 4 is a block diagram of a data injector according to an exemplary embodiment of the present invention.

FIG. 4 is a block diagram of a data injector according to an exemplary embodiment of the present invention.

As described above, the data injector is used in the lower-level security domains to inject the combined file, which includes a piece of the divided encoding/decoding program and a piece of the divided symmetric key distributed from the highest-level security domain. It also may provide other programs necessary to execute an encoding/decoding process into an encoder/decoder.

As illustrated, a data injector 400 includes a file reception module 410, a conversion module 420 and a communication module 430. The file reception module 410 receives, from a highest-level security domain, a file having a piece of the divided encoding/decoding program and a piece of the divided symmetric key in a combined form. The conversion module 420 converts the file into the divided encoding/decoding program piece and the divided symmetric key piece in an executable format in an encoder/decoder. The communication module 430 communicates with the encoder/decoder to inject the divided encoding/decoding program piece and the divided symmetric key piece to the encoder/decoder.

The communication module 430 may also inject a program to be required to operate the encoder/decoder, together with the divided encoding/decoding program piece and the divided symmetric key piece. Also, the data injector may further include a DB 440 for storing the divided encoding/decoding program piece and the divided symmetric key piece and a DB administrator 450.

Figure 5:
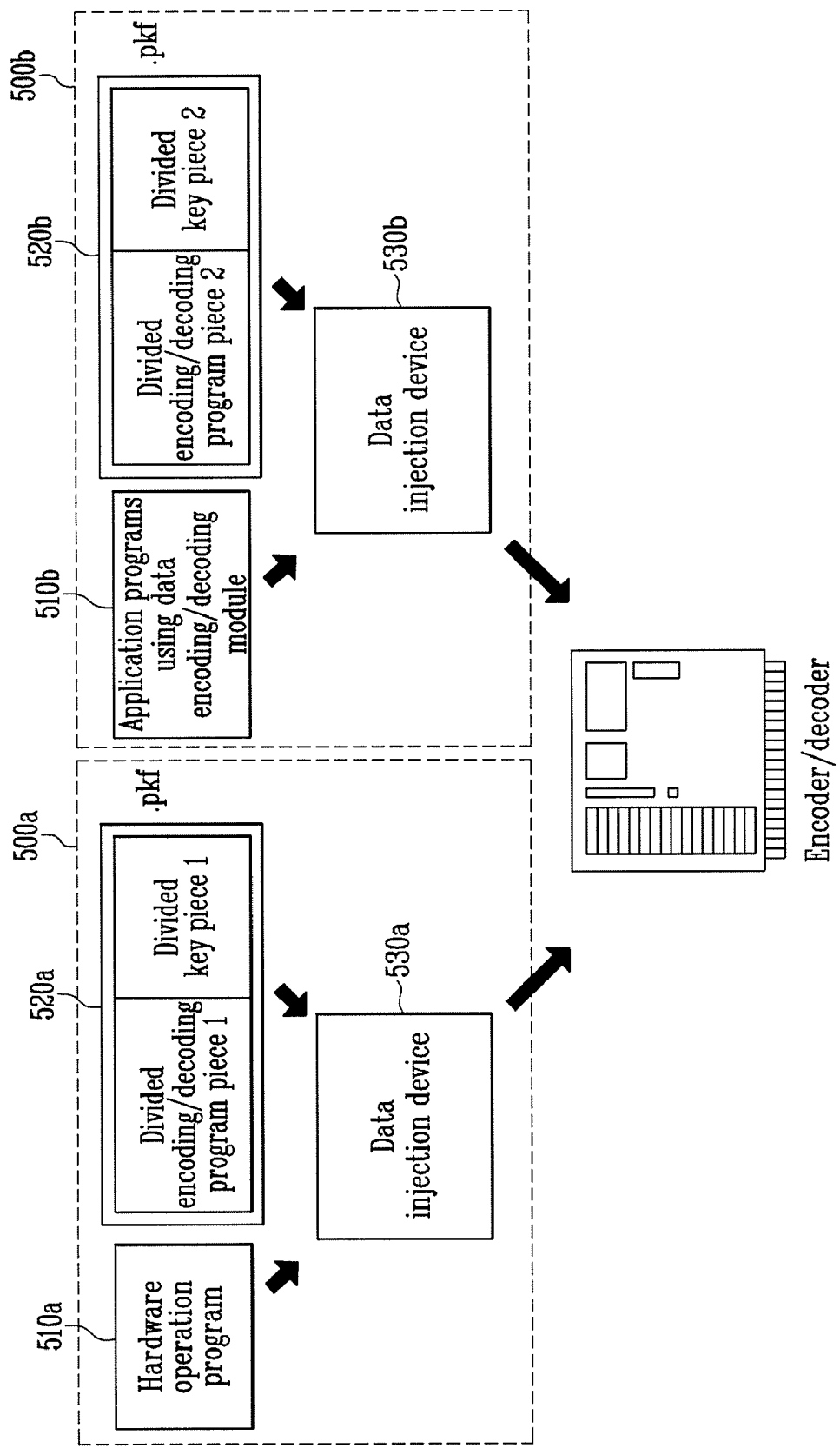
FIG. 5 illustrates an example in which divided pieces of the encoding/decoding program and key are injected into an encoder/decoder by devices of lower-level security domains according to an exemplary embodiment of the present invention.

FIG. 5 illustrates an example in which the divided encoding/decoding program piece and the divided symmetric key piece are injected into an encoder/decoder by devices belonging to lower-level security domains according to an exemplary embodiment of the present invention.

As illustrated, a system 500a operated by a hardware manufacturer, which belongs to a lower-level security domain (e.g., T-1 level), injects the divided encoding/decoding program piece 1 and the divided symmetric key piece 1 520a and a hardware operation program 510a necessary for the operation of hardware manufactured by itself to an encoder/decoder, using a data injector 530a. In addition, a system 500b operated by an application program developer, which belongs to another lower-level security domain (e.g., T-2 level), injects the divided encoding/decoding program piece 2 and the divided symmetric key piece 2 520a and an application program 510b developed by itself, using a data injector 530b.

Although it has been explained in the above that there exist two lower-level security domains, it would be easily understood that the present invention does not limit the number of the lower-level security domains. Any H/W and S/W manufactures, who belong to one of the lower-level security domains and manufacture H/W and S/W components necessary to implement a designated encoder/decoder, may receive the divided encoding/decoding program piece and the divided symmetric key piece from a highest-level security domain and inject them into the encoder/decoder using a data injector. When all the pieces of the divided encoding/decoding program and the divided symmetric key are injected into the encoder/decoder, the encoder/decoder can perform its function.

The present invention provides a method of safely distributing an encoding/decoding program and a key in a security domain, and it may be applied to a security domain environment. Also, since data (encoding/decoding program and key) is distributed in an incomplete form (in a divided form) to a device belonging to lower-level security domains, the data to be distributed is not exposed, so that secrecy of data can be ensured.

In the drawings and specification, there have been disclosed typical exemplary embodiments of the invention and, although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A method of distributing an encoding/decoding program and a symmetric key in a security domain environment, comprising:
    selecting, at a highest-level security domain, an encoding/decoding program and a symmetric key to be distributed to a plurality of lower-level security domains;
    dividing the selected encoding/decoding program and the symmetric key as many into pieces as the number of lower-level security domains,
    wherein the number of lower-level security domains are greater than 1
    wherein each of the selected encoding/decoding program and the symmetric key are divided based on the number of lower-level security domains, and
    wherein each of the divided encoding/decoding program and the divided symmetric key are mutually exclusive of each other; and
    distributing the divided encoding/decoding program pieces and the symmetric key pieces to respective devices belonging to the lower-level security domains.

2. The method of claim 1, further comprising:
    injecting the divided encoding/decoding program pieces and the symmetric key pieces received by the devices belonging to the lower-level security domains into an encoder/decoder,
    wherein the encoder/decoder is executed only when all of the divided encoding/decoding program pieces and the symmetric key pieces are injected into the encoder/decoder.

3. A data divider, comprising:
    a database configured to store at least one encoding/decoding program and at least one symmetric key;
    a program selection unit configured to provide a user interface such that a user selects one of the at least one encoding/decoding program to be distributed to a plurality of lower-level security domains;
    a key selection unit configured to provide a user interface such that the user selects one of the at least one symmetric keys to be distributed to the lower-level security domains;
    a divider configured to divide the selected encoding/decoding program and the selected symmetric key into pieces as many as the number of the lower-level security domains,
    wherein the number of lower-level security domains are greater than 1,
    wherein each of the selected encoding/decoding program and the symmetric key are divided based on the number of lower-level security domains, and
    wherein each of the divided encoding/decoding program and the divided symmetric key are mutually exclusive of each other; and
    a combination unit configured to combine each piece of the divided encoding/decoding program with each piece of the divided symmetric key to form each combined file.

4. The data divider of claim 3, wherein the combined file has an extension of .pkf.

5. The data divider of claim 3, wherein the divider divides the selected encoding/decoding program into at lease one executable module and at least one library.

6. The data divider of claim 3, wherein the data divider belongs to a highest-level security domain.

7. A data injector, comprising:
    a file receiver receiving by a processor a file including a piece of a encoding/decoding program and a piece of a symmetric key from a highest-level security domain,
    wherein each piece of the divided encoding/decoding program are mutually exclusive of each other,
    and each piece of the divided symmetric key are mutually exclusive of each other;
    a converter converting the file into a format executable by an encoder/decoder; and
    a communication unit communicating with the encoder/decoder to inject the converted file to the encoder/decoder.

8. The data injector of claim 7, wherein the data injector belongs to a lower-level security domain.

9. The data injector of claim 7, wherein the communication unit further injects a program required to implement the encoder/decoder to the encoder/decoder.

10. A method of distributing an encoding/decoding program and a symmetric key in a security domain environment, comprising:
    selecting, at a highest-level security domain, an encoding/decoding program and a symmetric key to be distributed to a plurality of lower-level security domains;

dividing the selected encoding/decoding program and the symmetric key as many into pieces as the number of lower-level security domains; and distributing the divided encoding/decoding program pieces and the symmetric key pieces to respective devices belonging to the lower-level security domains, and wherein each of the respective devices have the divided encoding/decoding program and divided symmetric key which are mutually exclusive of the divided encoding/decoding program and the divided symmetric in any of the other respective devices.

\* \* \* \* \*